(12) United States Patent
Dunbar, Jr.

(10) Patent No.: US 7,551,781 B1
(45) Date of Patent: Jun. 23, 2009

(54) ACTIVE MATRIX ACQUISITION AND TARGETING SYSTEM

(75) Inventor: Donal S. Dunbar, Jr., Wichita Falls, TX (US)

(73) Assignee: AJTech, Inc., Schertz, TX (US)

( * ) Notice: Subject to any disclaimer, the term of this patent is extended or adjusted under 35 U.S.C. 154(b) by 163 days.

(21) Appl. No.: 11/471,361

(22) Filed: Jun. 20, 2006

Related U.S. Application Data

(63) Continuation-in-part of application No. 11/445,051, filed on Jun. 1, 2006.

(51) Int. Cl.
*G06K 9/46* (2006.01)
(52) U.S. Cl. .................. 382/192; 342/52; 382/181
(58) Field of Classification Search .............. 342/52
See application file for complete search history.

(56) References Cited

U.S. PATENT DOCUMENTS

| | | | | |
|---|---|---|---|---|
| 4,776,691 A | * | 10/1988 | Johnson et al. | 356/152.1 |
| 5,471,214 A | * | 11/1995 | Faibish et al. | 342/70 |
| 6,396,577 B1 | * | 5/2002 | Ramstack | 356/141.1 |
| 2003/0184468 A1 | * | 10/2003 | Chen et al. | 342/52 |
| 2004/0233097 A1 | * | 11/2004 | McKendree et al. | 342/62 |

* cited by examiner

*Primary Examiner*—Thomas H Tarcza
*Assistant Examiner*—Timothy A Brainard
(74) *Attorney, Agent, or Firm*—Michael Diaz

(57) ABSTRACT

The present invention is a system and method of acquiring airborne objects utilizing a plurality of acquisition systems. The present invention is an active matrix acquisition system which includes several different types of acquisition systems, such as radar, infrared, and optical systems for scanning the sky in search of airborne objects. Data related to airborne objects are sent to a computing system of the active matrix system. The computing system compiles the data from the plurality of acquisition systems to determine a target resolution. The active matrix system may include a capability to select specific weighted inputs from each acquisition system. In addition, a confidence level may be assigned for determining a target resolution. The target resolution may be sent to a fire control system for use in destroying an airborne target.

18 Claims, 11 Drawing Sheets

ACTIVE MATRIX ACQUISITION AND TARGETING SYSTEM

RELATED APPLICATIONS

This application is a continuation-in-part of a co-pending U.S. patent application Ser. No. 11/445,051 by Donal S. Dunbar, Jr. entitled "REVERSE LOGIC OPTICAL ACQUISITION SYSTEM AND METHOD," filed Jun. 1, 2006 and is hereby incorporated in its entirety by reference herein.

BACKGROUND OF THE INVENTION

1. Field of the Invention

This invention relates to acquisition systems. Specifically, the present invention relates to an acquisition system compiling multiple inputs from different acquisition systems to determine a targeting resolution of an airborne target.

2. Description of the Related Art

Airborne acquisition systems have progressed considerably over the past few years. Great strides have been made in radar and optical systems to detect airborne targets. However airborne threats, such as aircraft and missiles, have utilized increasingly sophisticated technology to circumvent these acquisition systems. These modern aircraft have become more difficult to acquire either visually or through radar because of the employment of new technologies and various ingenious tactics. For example, aircraft utilize high velocity on ingress to a selected target, fly at heights above the ground (both high and low) to avoid detection and avoid threats, effectively use camouflage on the aircraft, and effectively fly and employ weapons at night. Radar acquisition systems are used to detect airborne objects. However, with the introduction of stealth technology on aircraft, radar acquisition systems alone are not enough to effectively detect airborne threats. Existing target acquisition radar cannot detect airborne threats utilizing this stealth technology.

State of the art stealth technology allows aircraft to effectively become invisible to radar. Most conventional aircraft have a rounded shape. This shape is efficient in terms of aerodynamics but also creates a very efficient radar reflector. The round shape means that no matter where the radar signal hits the aircraft, some of the transmitted radar signal is reflected back to the radar antenna. On the other hand, a stealth aircraft is made up of completely flat surfaces at very sharp edges. When a radar signal hits a stealth aircraft, the signal reflects away at an angle, away from the radar antenna. In addition, surfaces on a stealth aircraft can be treated so they absorb radar energy. The overall result is that a stealth aircraft such as U.S. Air Force's F-117 can have a radar signature of a small bird rather than an aircraft. Thus, use of radar only to effectively detect airborne objects has become increasingly difficult and unreliable.

Although there are several different ways of acquiring a target, target systems only take inputs from a single source or type of acquisition system. For example, surface to air missile systems either use optically or radar-based detection systems, not both systems simultaneously. Oftentimes, the determination of a target resolution is difficult by utilizing only one type of system for the reasons discussed above. In addition, a confidence level of target acquisition often changes depending on the environment for which the acquisition systems are operating. For example, over New York City, the confidence level must be extremely high before authorizing the release of weapons. However, in a combat zone, the confidence level may be considerably less. A system is needed which incorporates inputs from several acquisition system sources, providing a selectable weight for each input to determine a target resolution based on a specified confidence.

Thus, it would be a distinct advantage to have an acquisition system which utilizes a plurality of inputs from various types of acquisition systems to determine a target resolution for a specified level of confidence. It is an object of the present invention to provide such a system and method.

SUMMARY OF THE INVENTION

In one aspect, the present invention is an acquisition system for detecting an airborne object. The system includes a plurality of acquisition systems for scanning a portion of the sky. Each acquisition system is capable of detecting an airborne object and providing data on each detected airborne object. The system also includes a computing system for compiling data received from the plurality of acquisition systems. The computing system determines a target resolution from the compiled data. The system may also selective provide weight input values for each acquisition system for determining a target resolution. The target resolution may be optionally used by a fire control system for directing weapons against the detected airborne object.

In another aspect, the present invention is an acquisition system for detecting an airborne object. The system includes a plurality of acquisition systems for scanning a portion of the sky. Each acquisition system is capable of detecting an airborne object and providing data on each detected airborne object. Preferably, each acquisition system detects airborne objects utilizing a different type of detection capability, such as one acquisition system using radar, another acquisition system utilizing optical detection equipment, and still another acquisition system utilizing infrared detection equipment. In addition, the system includes a computing system for compiling data received from the plurality of acquisition systems. The computing system determines a target resolution from the compiled data. In addition, the computing system may selectively provide weighted inputs for data received from each acquisition system for determining the target resolution.

In still another aspect, the present invention is a method of detecting an airborne object. The method begins by providing a plurality of acquisition systems for scanning a portion of the sky. Each acquisition system is capable of detecting an airborne object and providing data on each detected airborne object. Next, the data is compiled by a computing system from each acquisition system. A target resolution is determined by the computing system from the compiled data. The computing system may provide selected weighted inputs from the data received from each acquisition system. In addition, the computing system may select a confidence level necessary for determining a target resolution.

DESCRIPTION OF THE INVENTION

Figure 1:
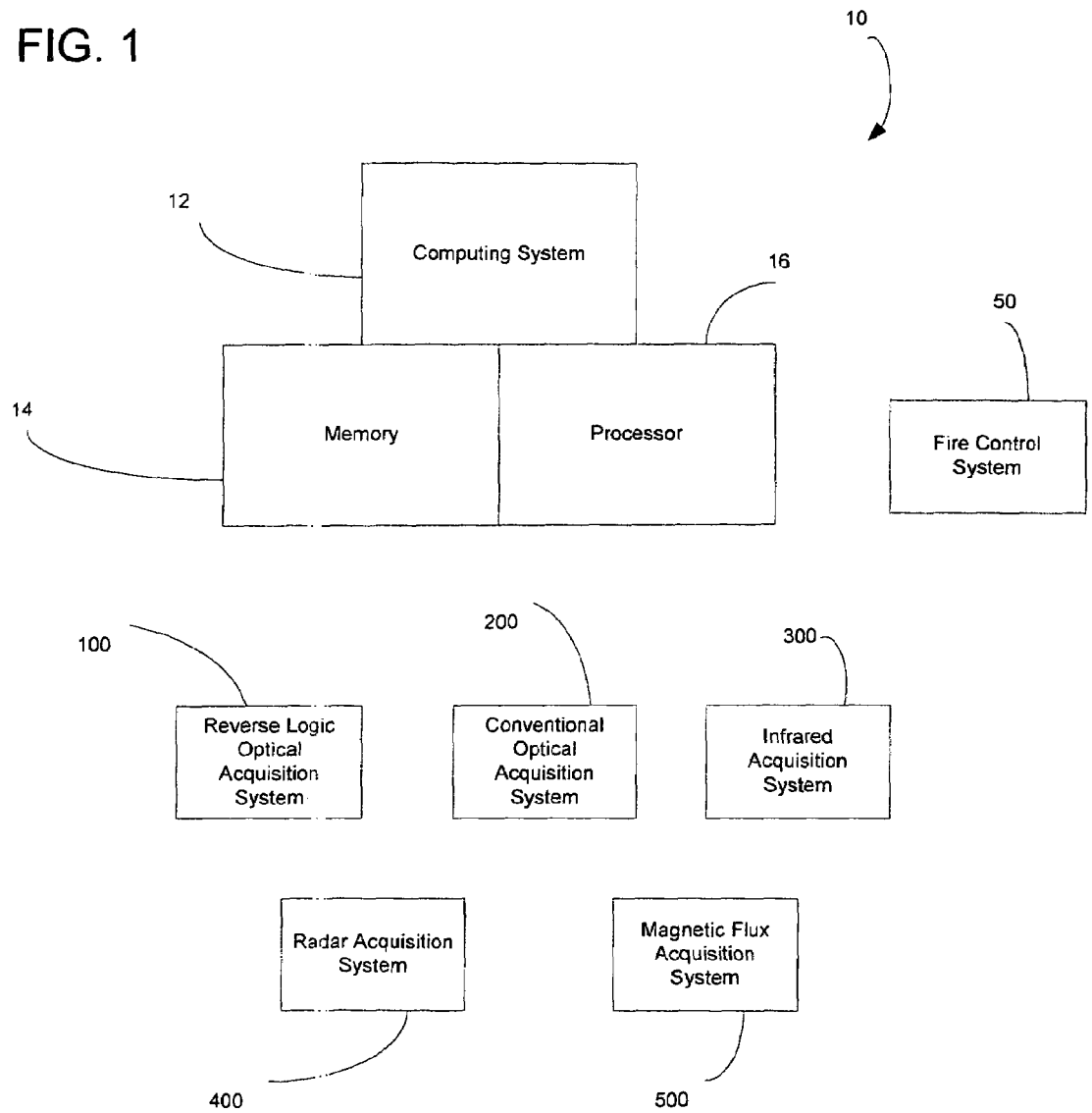
FIG. 1 is a simplified block diagram of the components of an active matrix system in the preferred embodiment of the present invention.

An airborne target acquisition system utilizing a plurality of weighted inputs at a specified level of confidence is disclosed. FIG. 1 is a simplified block diagram of the components of an active matrix system 10 in the preferred embodiment of the present invention. The active matrix system includes a computing system 12 having a memory 14 and a processor 16. The computing system may be any computing system, which provides computations and analysis of data from several sources. The active matrix system includes a plurality of input sources for detecting airborne targets or objects. The active matrix system may include a reverse logic optical acquisition system 100, a conventional optical acquisition system 200, an infrared acquisition system 300, a radar acquisition system 400, and a magnetic flux acquisition system 500. Each of the acquisition systems 100, 200, 300, 400, and 500 communicate and provide data to the active matrix system 10. It should be understood that the acquisition systems discussed in FIG. 1 are merely exemplary. The active matrix system may use one or more of these acquisition systems or additional acquisition systems which may or may not have been developed to acquire airborne targets. The airborne target acquisition system may also be associated with an optional fire control system 50 which provides a capability for destroying airborne targets.

Figure 2:
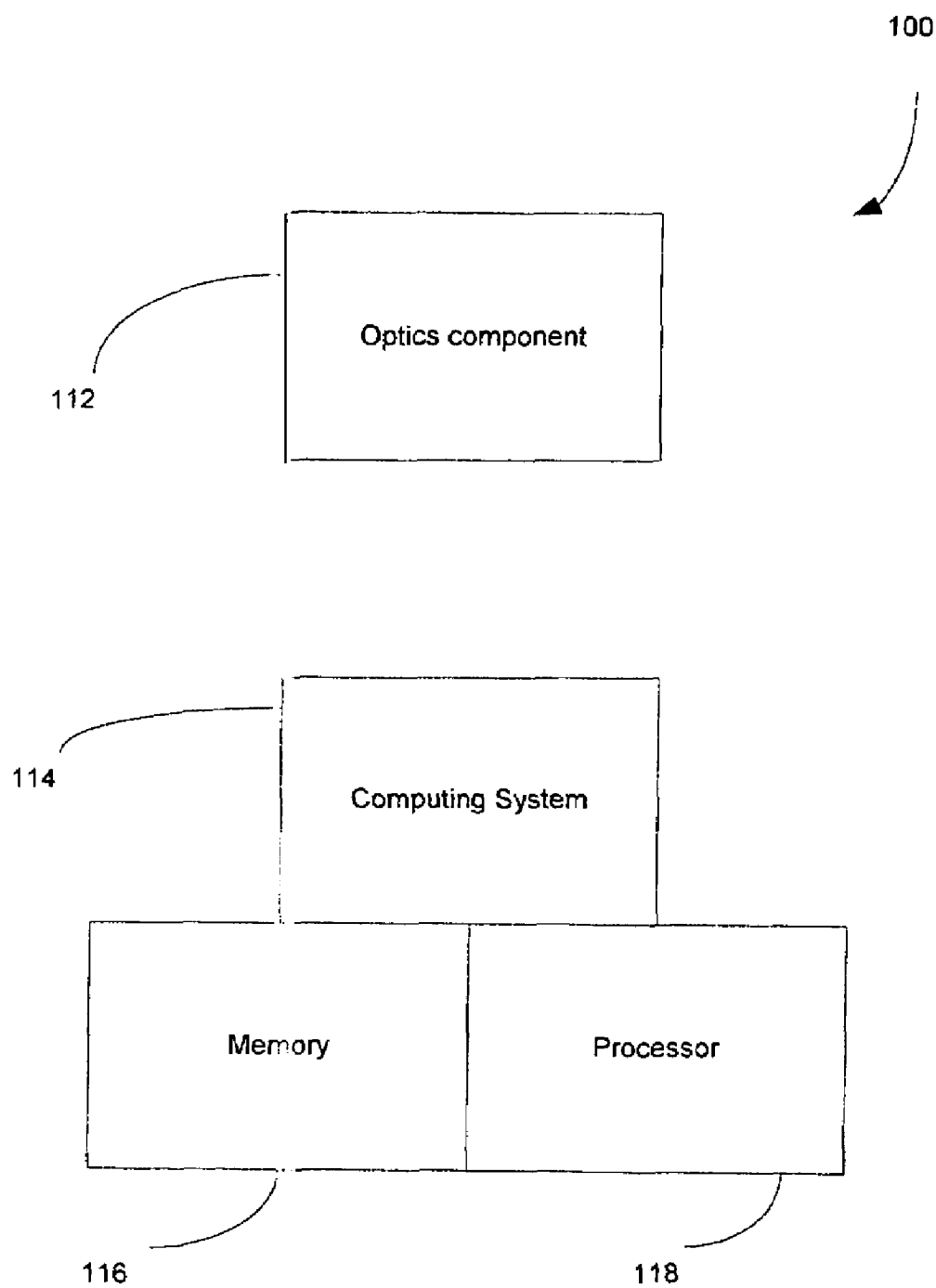
FIG. 2 is a simplified block diagram of the components of the reverse logic optical acquisition system of FIG. 1.

FIG. 2 is a simplified block diagram of the components of the reverse logic optical acquisition system 100 of FIG. 1. The reverse logic optical acquisition system includes an optics component 112 and a computing system 114. The optics component is an optical acquisition device which scans an area in the sky in search of light sources. The optics component determines the location of detected light sources. The optics component may be any device able to detect light sources in any spectrum of the light (e.g., infrared range, visible range etc.), such as optical magnifiers and infrared detectors. In the preferred embodiment of the present invention, the optics component may measure the intensity of light sources in the sky, the size of the detected objects, as well as determine the location of the light sources. Specifically, the optics component may utilize night vision technology, which relies on light amplification to augment images.

The computing system 114 may be any computer providing a memory 116 and a processor 118. The computing system 114 receives data from the optics component 112 to include location, size, and intensity of light sources. The computing system stores the information within the memory 116. In addition, the computing system may determine an average intensity of the light sources to include any ambient or background light sources, such as from starlight or sunlight. The computing system, through the processor 118, determines when a specific location of the sky has a lower light intensity than a threshold level of light intensity, within a specified deviation. The lower light intensity may be indicative of an object flying in a portion of the sky which blocks any ambient or background light sources, such as from starlight, reflected ground-source illumination, or sunlight. The computing system may track the lower than normal light source. If the lower than normal light source moves across the sky, a target may be indicated and provided to the acquisition system operator.

Figure 3A:
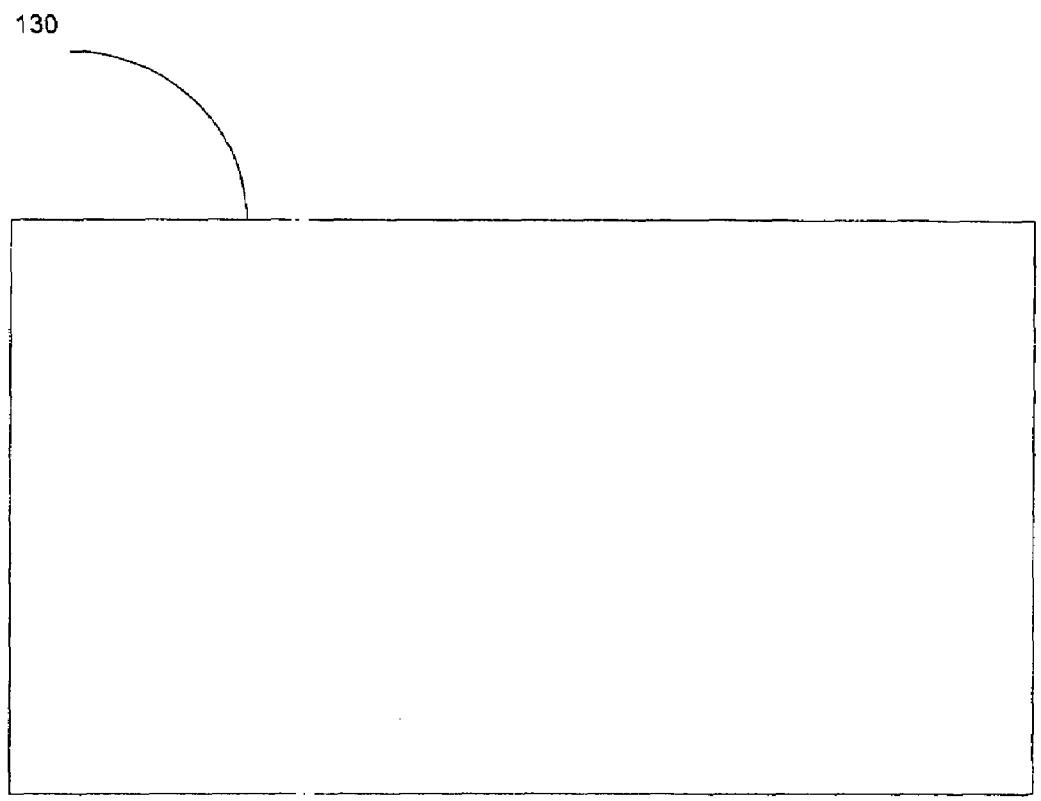
FIGS. 3A and 3B are graphical illustrations of an exemplary optical search result in the preferred embodiment of the present invention.
Figure 3B:
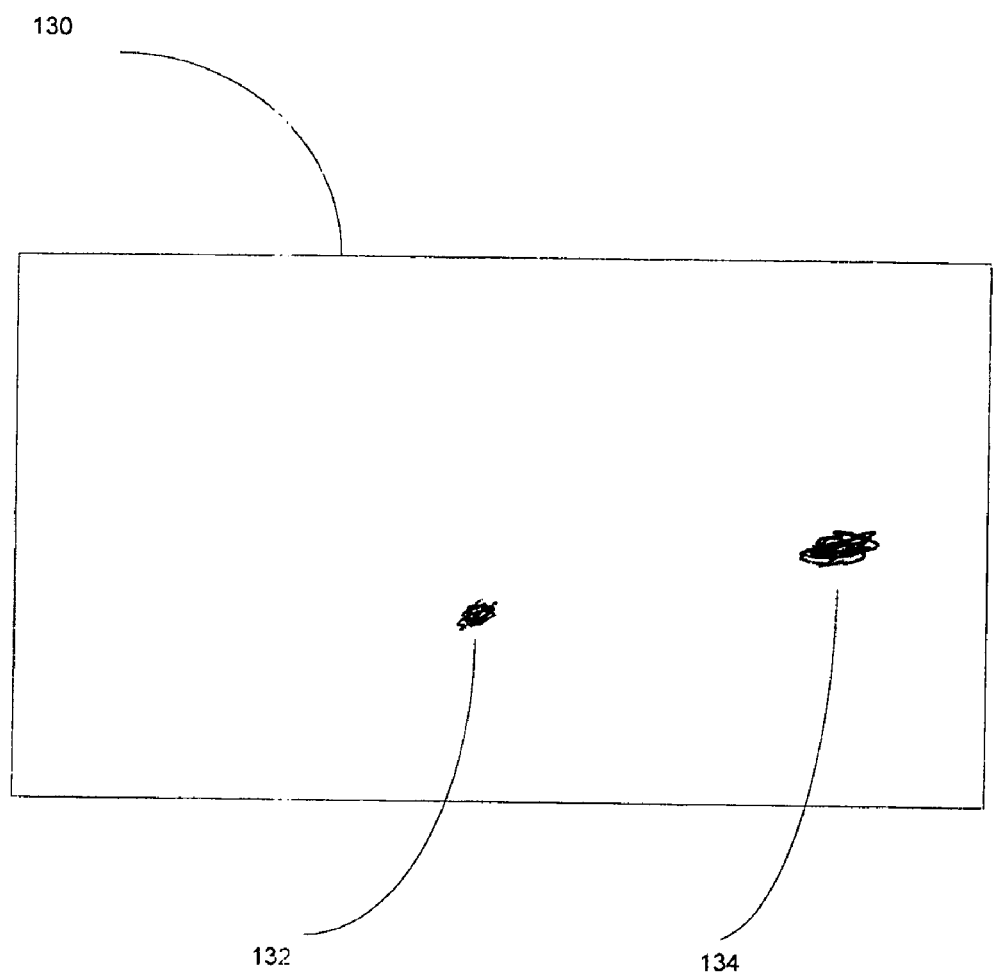

FIGS. 3A and 3B are graphical illustrations of an exemplary optical search result in the preferred embodiment of the present invention. In FIG. 3A, a portion of the sky 130 is observed by the optics component 112. As illustrated in FIG. 3A, there are no hidden airborne objects. Sky 130 shows a relatively constant level of light intensity throughout the portion of observed sky. In FIG. 3B, two dark objects 132 and 134 are shown in front of the sky 130. The objects may be hidden from radar, however since the objects have a mass and size that cannot be hidden, the objects shield the background or ambient light from being observed by the optics component. An example of this blocking characteristic may be shown with clouds. Without the presence of clouds, the sunshine reaches the ground. However, when clouds block the sun, some or all of the sunlight is blocked. In a similar manner, an aircraft blocks the light sources (e.g., starlight, reflected ground-source illumination or sunlight) from being detected fully.

Figure 4:
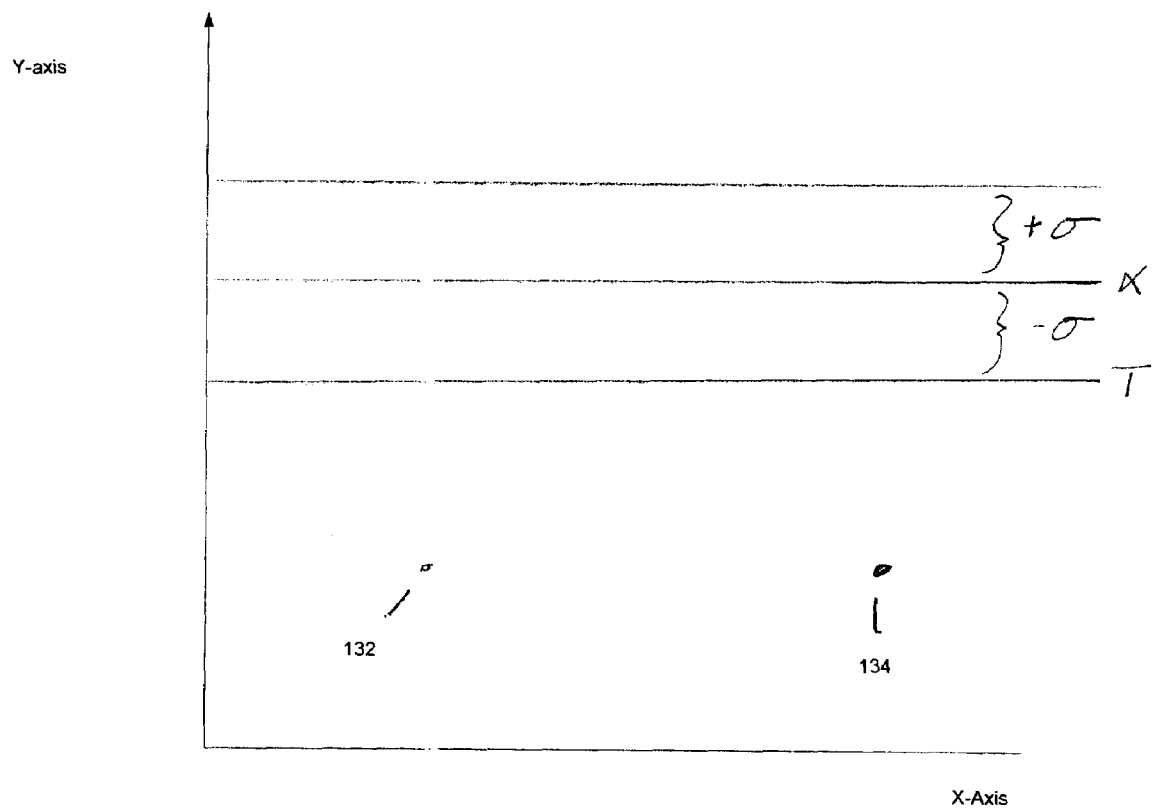
FIG. 4 is an exemplary graph illustrating light intensity in a portion of the sky.

FIG. 4 is an exemplary graph illustrating light intensity in a portion of the sky. The X-axis may measure the azimuth or distance from the optics component while the Y-axis represents the intensity of light of the selected portion of the sky. An average light intensity $\alpha$ is show for the selected portion of sky. Standard deviations $+\sigma$ and $-\sigma$ are calculated by the computing system 114. The $-\sigma$ provides a threshold T for determining the presence of an airborne object. When the detected light intensity falls below the threshold, an airborne object is indicated.

With reference to FIGS. 2, 3A, 3B, and 4, the operation of the reverse logic optical acquisition system 100 will now be explained. The acquisition system 100 preferably divides the sky into designated sectors. The optics component searches a specified sector of the sky for light sources. Information relating to the total light sources over a sector of sky is sent to the computing system 114. The computing system determines an average light intensity for a specific area of sky searched. In addition, the computing system, through historical data and other external information taking into account weather, time of day or night, and time of the year, calculates the average light intensity and a threshold T. If a light source's light intensity falls below the threshold T, an airborne object may be blocking background or ambient light from being detected by the optics component. This threshold T may be determined from previous gathered data or information provided to the computing system for use in determining the threshold.

Once given the average light intensity and threshold T, the optics component begins searching the sky in the specified sector for areas where the light intensity in a specific area of sky is below the specified threshold. The areas having low light intensity below the specified threshold are tracked by storing the location in the sky within the computing system. The areas and their vicinity of probable airborne objects may be monitored for further movement. As discussed above, the light of a light source or the detection of below normal light intensity of a specified sector of sky is indicative of an airborne target. Therefore, the computing system, through the optics component utilizes a reverse logic to find the airborne targets. Specifically, rather than trying to find light sources to indicate a flying object, the acquisition system finds areas of the sky where the detected light is below the specified threshold. This low light intensity indicates an airborne object which blocks out ambient or background light.

The computing system 114 may optionally track the low light intensity source for further detailed scrutiny. The movement of the low light intensity source may be used in the computing system logic to determine the presence of an airborne object. The movement may also provide a further indication of a man-made airborne object. Furthermore, the computing system 114 may be used to determine the velocity and direction the airborne object is traveling.

The computing system 114 may utilize the information gathered from the optics component 112 to determine those areas having a low light intensity. Further scrutiny of these low light intensity areas by either optical or other non-optical detections means may be used to determine the location of airborne objects. However, as stated above, the reverse logic optical acquisition system 100 utilizes the reserve logic of finding sources of low light intensity rather than attempting to optically track the airborne target directly. Data on the detected airborne objects acquired by the reverse logic optical acquisition system 100 is sent to the active matrix system 10.

Figure 5:
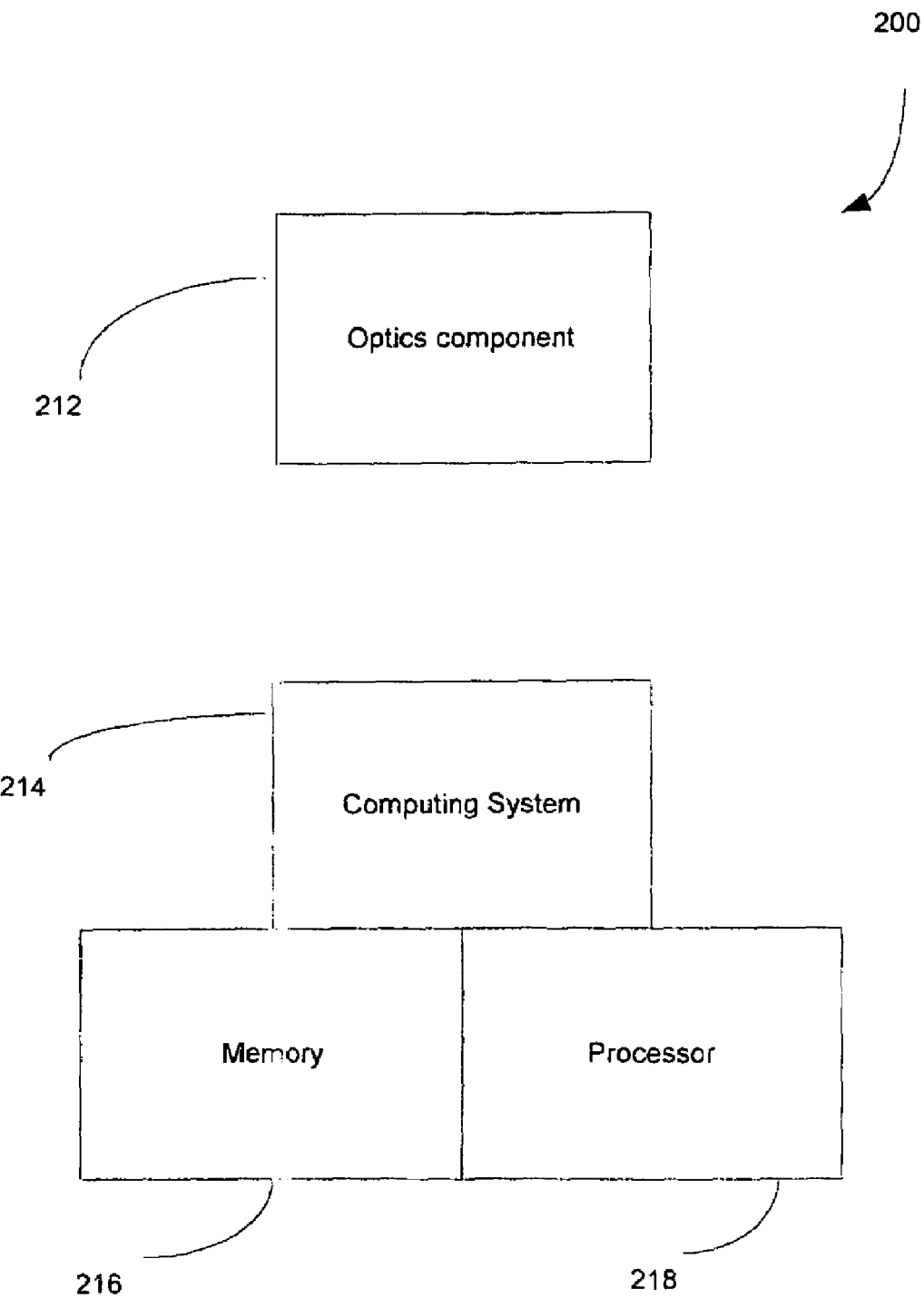
FIG. 5 is a simplified block diagram of the components of the conventional optical acquisition system of FIG. 1.

FIG. 5 is a simplified block diagram of the components of the conventional optical acquisition system 200 of FIG. 1. The optical acquisition system 200 may also include an optics component 212 for optically detecting airborne objects. The optics component magnifies light sources visible to the naked eye. An optical magnification device may be used for scanning and acquiring targets visually. The optical acquisition system 200 may also include a computing system 214, a memory 216 and a processor 218.

The computing system 214 may be any computer having the memory 216 and the processor 218. The computing system 214 receives data from the optics component 212 to include location, size, and intensity of light sources. The computing system stores the information within the memory 216. The computing system provides data on the acquired target to the active matrix system 10.

Figure 6:
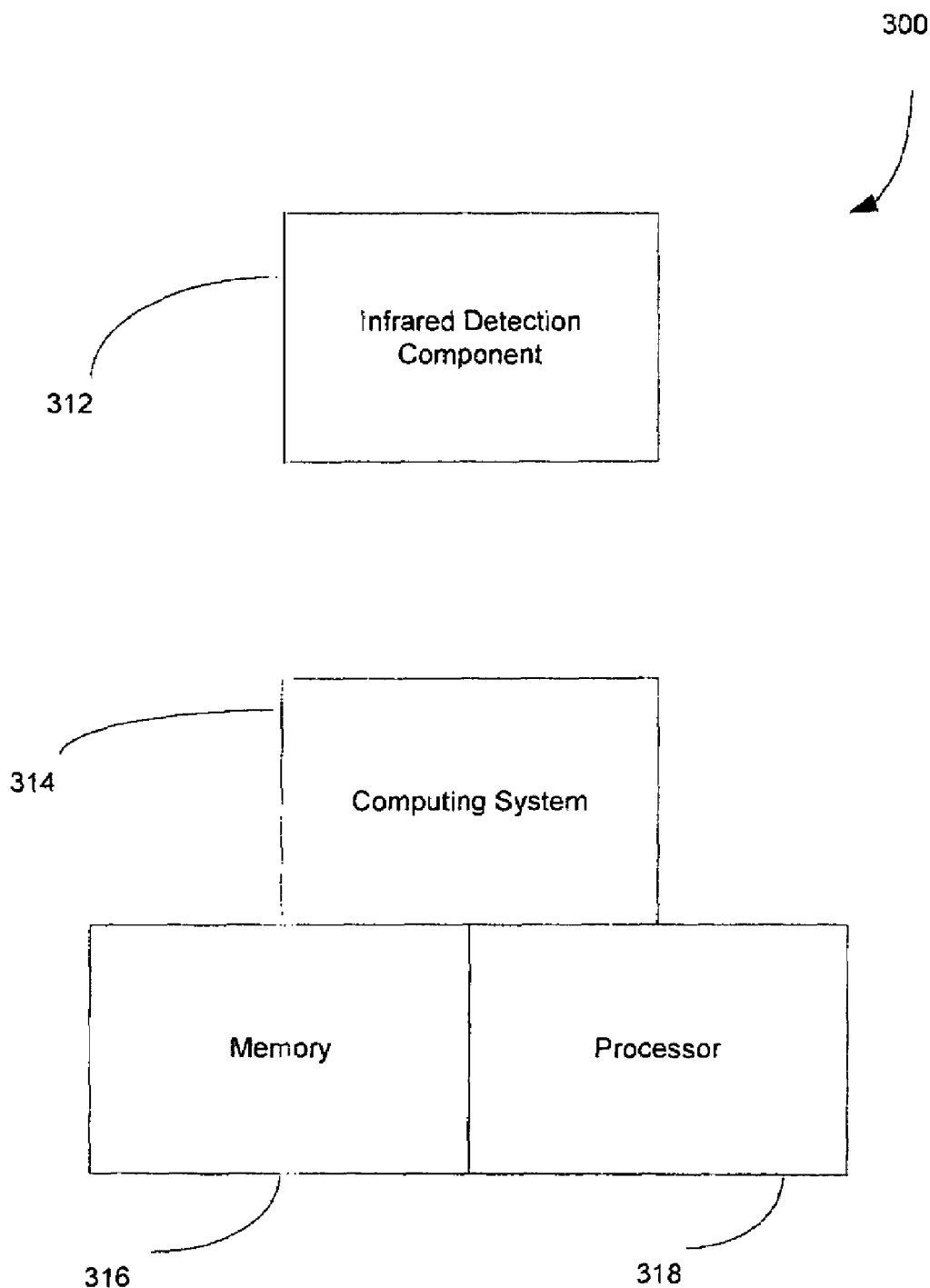
FIG. 6 is a simplified block diagram of the infrared acquisition system of FIG. 1.

FIG. 6 is a simplified block diagram of the infrared acquisition system 300 of FIG. 1. The infrared acquisition system 300 includes an infrared detection component 312 to detect any infrared signatures from airborne targets. The infrared acquisition system 300 also includes a computing system 314 having a memory 316 and a processor 318. The infrared detection component may be any device which can detect infrared signatures. Infrared signatures are associated with heat sources commonly used to detect engines of an aircraft. The infrared detection component detects an infrared signature and provides the data to the computing system 314. Through the processor and memory, the computing system determines the location, size of the infrared source and the intensity of the infrared source. The computing system may determine the type of airborne object by the type of infrared signature which may be stored in the memory. Oftentimes, specific types of aircraft or airborne vehicles have a very specific type of infrared signature. The computing system may match the detected infrared signature with a stored type of infrared signature to determine the type of airborne object. All the data detected and determined by the infrared acquisition system is sent to the active matrix system 10.

Figure 7:
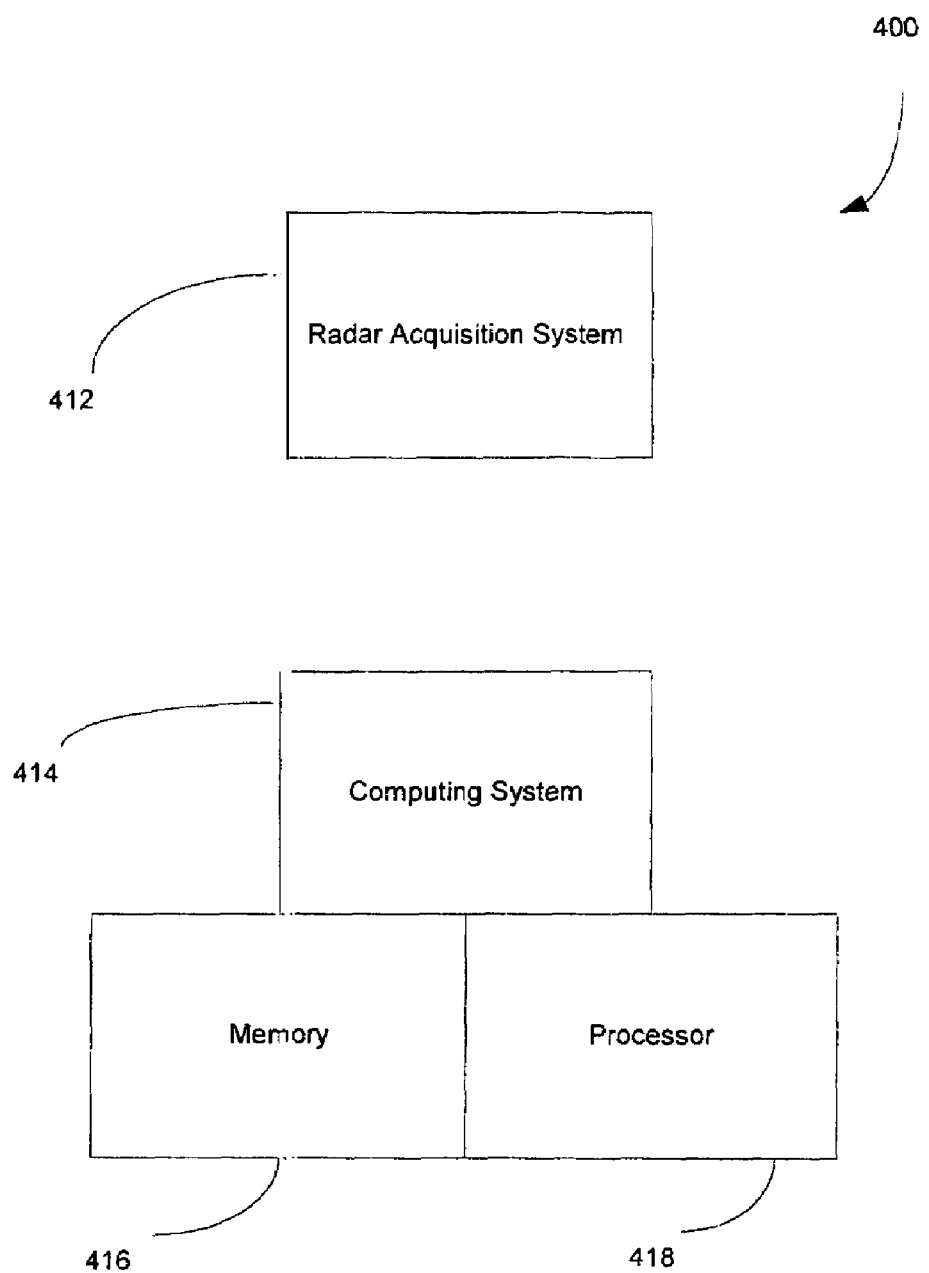
FIG. 7 is a simplified block diagram of the radar acquisition system of FIG. 1.

FIG. 7 is a simplified block diagram of the radar acquisition system 400 of FIG. 1. The radar acquisition system includes a radar system 412 and a computing system 414 having a memory 416 and a processor 418. The radar system may be any radar system which detects airborne targets through radar. The radar system detects a radar signature and provides the data to the computing system 414. Through the processor and memory, the computing system determines the location, size of the radar signature source and the radar source intensity. The computing system may determine the type of airborne object by its radar signature, which may be stored in the memory. Specific types of aircraft or airborne vehicles also have a very specific type of radar signature. The computing system may match the detected radar signature with a stored type of radar signature to determine the type of airborne object. All the data detected and determined by the radar acquisition system is sent to the active matrix system 10.

Figure 8:
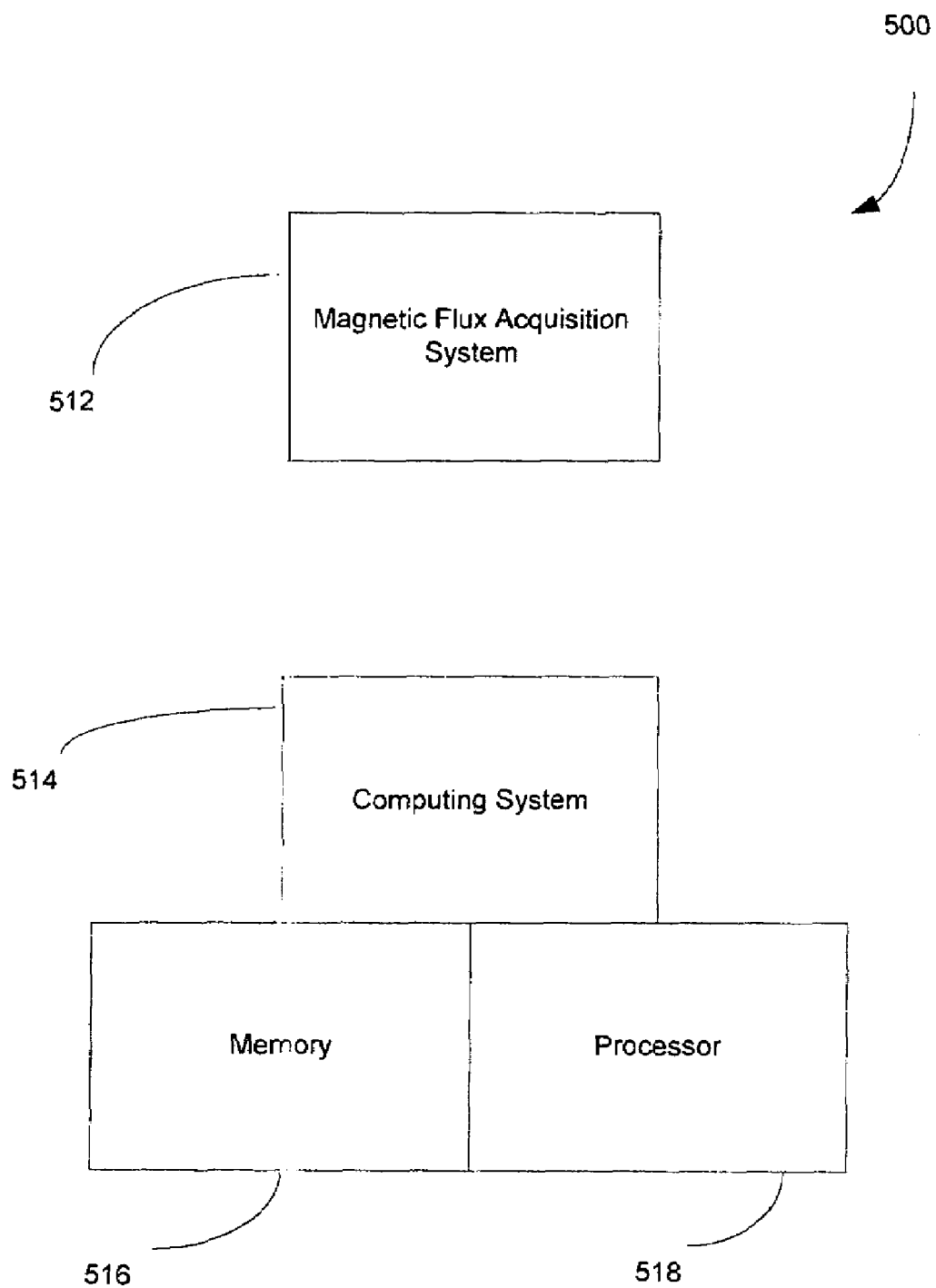
FIG. 8 is a simplified block diagram of the magnetic flux acquisition system of FIG. 1.

FIG. 8 is a simplified block diagram of the magnetic flux acquisition system 500 of FIG. 1. The magnetic flux acquisition system includes a magnetic flux detection system 512 and a computing system 514 having a memory 516 and a processor 518. The magnetic flux detection system detects magnetic fluxes which may be associated with airborne objects. The magnetic flux detection system provides detected magnetic flux sources and sends any data associated with the sources to the computing system 514. The computing system 514 provides the data, which may include the location, size and intensity of the magnetic flux source to the active matrix system 10.

The computing system of each acquisition system may be the computing system 12 or individual units associated with each acquisition system. In addition, the active matrix system 10 may use one or more of the acquisition systems to provide a target resolution defining the target. The active matrix compiles all sources of the data from the desired acquisition systems.

An operator or the computing system 12 may define specific weights for each acquisition system. For example, at night, the reverse logic optical acquisition system 100 and the radar acquisition system 400 may be weighted considerably higher than the optical acquisition system 200. In another example, the optical acquisition system 300 may be weighted higher than the radar system 400 in day and clear conditions.

An operator or computing system 12 of the active matrix 10 may also select the confidence level for which a target resolution of the airborne target is determined and fed to the fire control system 50. The confidence level may change on various conditions. For example, in wartime in a combat zone, the level of confidence may not have to be very high because all unknown objects may be considered hostile. However, in peacetime over a large city, the confidence level may have to be extremely high because of the possibility of non-hostile unknown aircraft being present.

In addition, the use of a global position system (GPS) may be utilized with the active matrix system 10. The GPS may be used to select a specific sector of the sky to observe by the plurality of acquisition systems. In addition, the GPS may be used by the fire control system to direct weaponry on a location determined by the active matrix system 10.

With reference to FIGS. 1-8, the operation of the active matrix system 10 will now be explained. A plurality of acquisition systems is employed to detect airborne objects. The active matrix system may utilize the detection capabilities of the reverse logic optical acquisition system 100, the conventional optical acquisition system 200, the infrared acquisition system 300, the radar acquisition system 400, and the magnetic flux acquisition system 500. Other types of acquisition systems may optionally be employed. Either the operator manually selects the weight of each piece of data found by each acquisition system or the computing system 12 automatically determines the correct weights. For example, at night with poor visibility, the radar acquisition system is weighted the highest, followed by other acquisition systems as determined to be the most advantageous for detecting airborne objects. If the computing system 12 is used to determine the appropriate weights, the computing system may utilize an algorithm which uses weather conditions, time of day, time of year, terrain, and type of threat to determine the appropriate weights. In addition, the user or the computing system determines the confidence level of any target resolutions which are sent to the fire control system 50 or interceptor aircraft.

Each acquisition system scans the sky or sector of sky for airborne objects. For example, the reverse logic optical acquisition system 100, through the optics component 112 detects light sources. The computing system 112 determines areas of sky where there is a lack of light source which is determined to be below an acceptable threshold. The source of the lack of light, its location, and light intensity are sent from the computing system 114 to the computing system 12 of the active matrix system 10. Likewise, the optical acquisition system 200, the infrared acquisition system 300, the radar acquisition system 400 and the magnetic flux acquisition system 500 each may provide inputs of detected airborne objects to the computing system 12. The computing system then compiles the accumulated data. In addition, the computing system assigns weight for each data input based upon the type of acquisition system utilized. A target resolution is developed from the accumulated weighted data. If the target resolution falls below the confidence level, the target resolution data is not provided to the fire control system 50. However, if the target resolution is above the specified confidence level, the target resolution data is sent to the fire control system for input in targeting and destroying the airborne targets. The determination of the confidence level may be determined also by an algorithm which utilizes the various data input sources to verify each detected target. If two or more acquisition systems detect the airborne target, the confidence level increases.

Figure 9A:
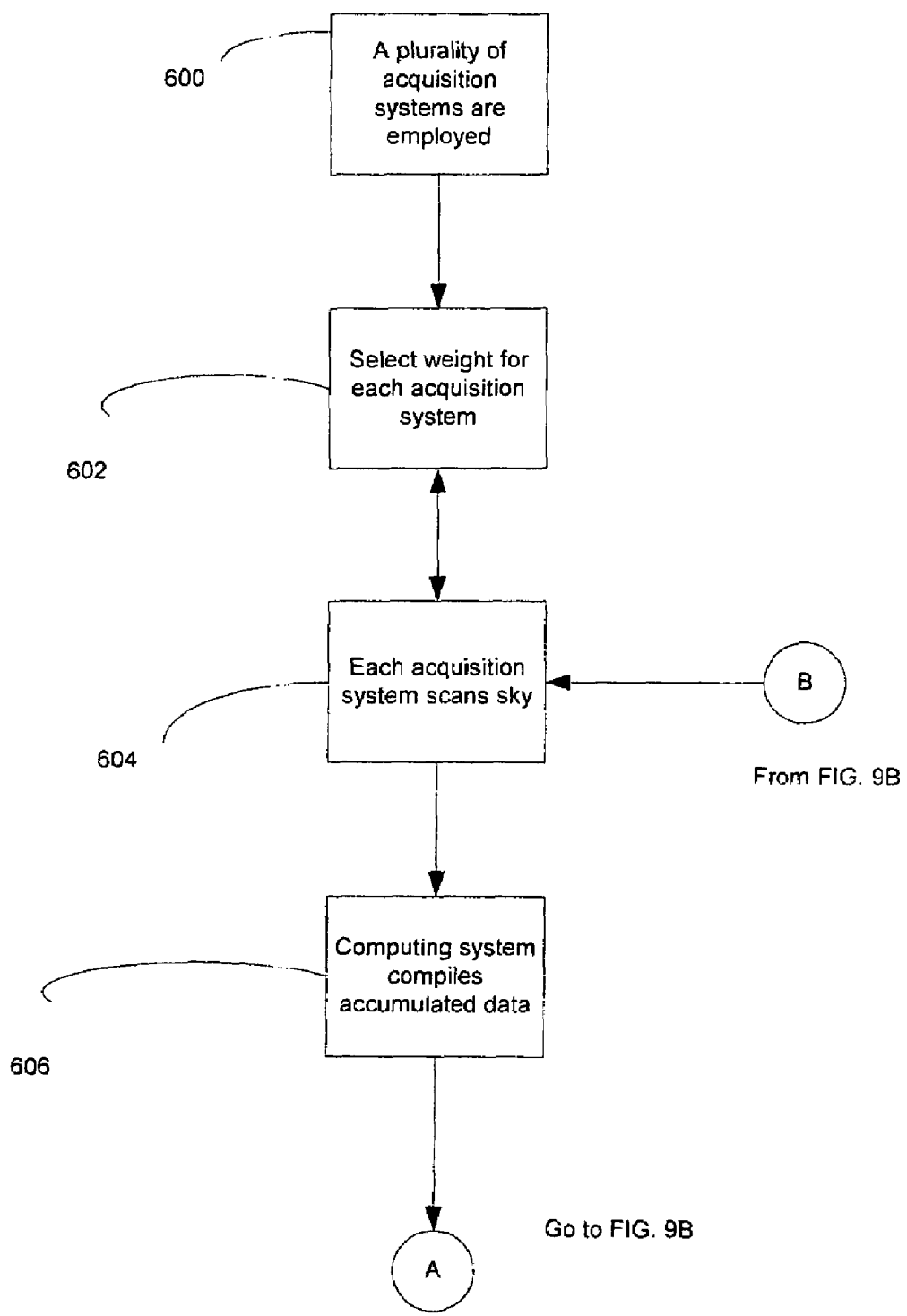
FIGS. 9A and 9B are flow charts outlining the steps for acquiring an airborne target utilizing the active matrix system according to the teachings of the present invention.
Figure 9B:
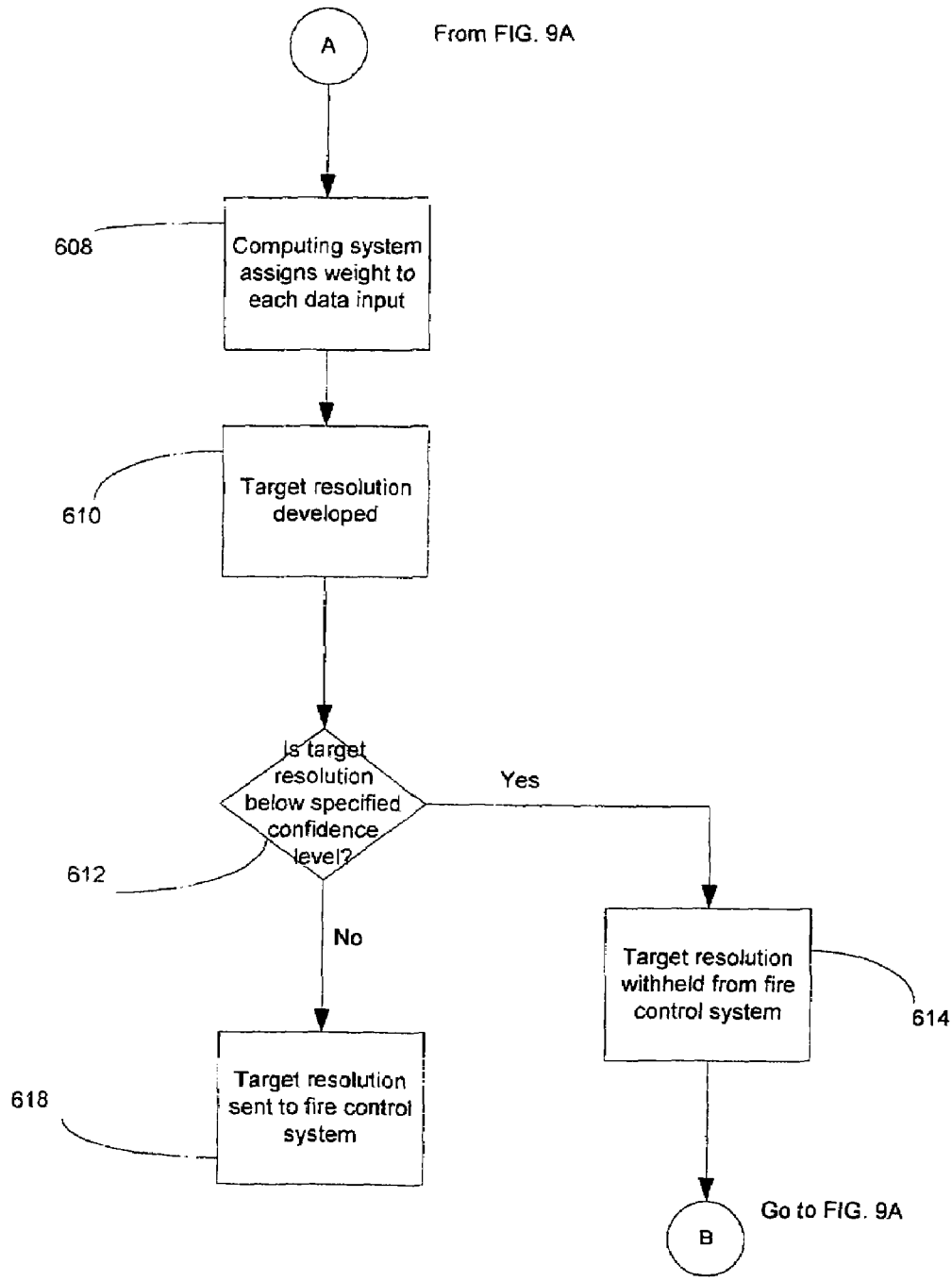

FIGS. 9A and 9B are flow charts outlining the steps for acquiring an airborne target utilizing the active matrix system 10 according to the teachings of the present invention. With reference to FIGS. 1-9, the steps of the method will now be explained. In step 600, a plurality of acquisition systems is employed to detect airborne objects. The active matrix system may utilize the detection capabilities of the reverse logic optical acquisition system 100, the conventional optical acquisition system 200, the infrared acquisition system 300, the radar acquisition system 400, and the magnetic flux acquisition system 500. Two or more types of acquisition systems may be optionally employed. Next, in step 602, either the operator manually selects the weight of each piece of data found by each acquisition system or the computing system 12 automatically determines the correct weights. At night, for example, the radar acquisition system may be weighted the highest, followed by other acquisition systems which are determined to be most advantageous for detecting airborne objects. If the computing system 12 is used for determining the appropriate weights, the computing system may operate an algorithm which accounts for weather conditions, time of day, time of year, terrain, and type of threat to determine the appropriate weights. Next, in step 604, the user or the computing system determines the confidence level of any target resolutions which are sent to the fire control system 50 or interceptor aircraft.

Next, in step 604, each acquisition system scans the sky or sector of sky for airborne objects. For example, the reverse logic optical acquisition system 100, through the optics component 112, is employed to detect light sources. The computing system 112 determines areas of sky where there is a lack of light source which is determined to be below an acceptable threshold. The source of the lack of light, its location, and light intensity are sent from the computing system 114 to the computing system 12 of the active matrix system 10. The optical acquisition system 200 may visually detect, through the optics component 212, an airborne object. Likewise, for example, the infrared acquisition system 300, the radar acquisition system 400 and the magnetic flux acquisition system 500 each may provide inputs of detected airborne objects to the computing system 12.

Next, in step 606, the computing system 12 then compiles the accumulated data. In step 608, the computing system 12 or operator assigns a weight for each data input according to the type of acquisition system. In step 610, a target resolution is developed from the accumulated weighted data.

The method then moves to step 612, where it is determined if the target resolution falls below the confidence level. If the confidence level of the target resolution falls below the specified confidence level, the method moves to step 614 where the target resolution data is not provided to the fire control system 50. Next, the method returns to step 604 where the acquisition systems continues to scan for airborne targets.

However, if it is determined by the computing system 12 that the target resolution is above the specified confidence level, the method moves from step 612 to step 618 where the target resolution data is sent to the fire control system for input in targeting and destroying the airborne targets. The confidence level may be determined also by an algorithm which utilizes the various data input sources to verify each detected target. If two or more acquisition systems detect the airborne target, the confidence level increases.

The present invention provides many advantages over existing acquisition systems. Rather than utilizing just one type of acquisition system in detecting an airborne target, the present invention incorporates the input from several different sources of acquisition systems to create a target resolution. The present invention also allows the user to manually determine both the confidence level of the computed target resolution as well as the weight assigned to each type of acquisition system. In addition, the computing system of the active matrix enables the computation of appropriate confidence levels and weights by determining the environment, weather conditions, time of day, time of year and other relevant data.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. An acquisition system for detecting an airborne object, said system comprising:
   a plurality of acquisition systems for scanning a portion of the sky, each acquisition system capable of detecting an airborne object and providing data on each detected airborne object;
   wherein one of the plurality of acquisition systems is a reverse logic optical acquisition system; and a computing system for compiling data received from the plurality of acquisition systems, the computing system determining a target resolution from the compiled data;

wherein the target resolution provides information for targeting and destroying the airborne object.

2. The acquisition system for detecting an airborne object of claim 1 wherein the computing system assigns a weighted input value for data from each acquisition system to determine the target resolution from the compiled data.

3. The acquisition system for detecting an airborne object of claim 1 wherein the computing system assigns a confidence level defining the level of confidence of the determined target resolution.

4. The acquisition system for detecting an airborne object of claim 3 wherein the target resolution is provided to a fire control system when the confidence level select exceeds a specified confidence level.

5. The acquisition system for detecting an airborne object of claim 1 further comprising means for selecting a weighted input value for data from each acquisition system to determine the target resolution from the compiled data.

6. The acquisition system for detecting an airborne object of claim 1 further comprising means for selecting a specified confidence level by an operator for the determined target resolution.

7. The acquisition system for detecting an airborne object of claim 1 wherein at least two of the acquisition systems detect airborne objects utilizing different types of detection systems.

8. The acquisition system for detecting an airborne object of claim 7 wherein a first acquisition system is a radar acquisition system and a second acquisition system is an optical acquisition system.

9. The acquisition system for detecting an airborne object of claim 1 wherein:

a first acquisition system of the plurality of acquisition systems is a radar acquisition system;

a second acquisition system of the plurality of acquisition systems is an optical acquisition system;

the computing system includes a capability to select weights to be assigned to each acquisition system for weighting an input value used in determining the target resolution; and the computing system includes a capability to select a confidence level necessary to generate a target resolution.

10. The acquisition system for detecting an airborne object of claim 1 further comprising a fire control system for directing weapons against the detected airborne objects by utilizing the determined target resolution of the computing system.

11. An acquisition system for detecting an airborne object, said system comprising:

a plurality of acquisition systems for scanning a portion of the sky, each acquisition system capable of detecting an airborne object and providing data on each detected airborne object;

wherein one of the plurality of acquisition systems is a reverse logic optical acquisition system;

a computing system for compiling data received from the plurality of acquisition systems, the computing system determining a target resolution from the compiled data;

wherein the target resolution provides information for targeting and destroying the airborne object; and means for selectively weighting input data from each acquisition system for determining the target resolution.

12. The acquisition system for detecting an airborne object of claim 11 further comprising means for selectively setting a confidence level necessary for determining a target resolution.

13. The acquisition system for detecting an airborne object of claim 11 further comprising a fire control system linked to the computing system for directing weapons against detected airborne objects utilizing the determined target resolution.

14. The acquisition system for detecting an airborne object of claim 11 wherein at least two of the acquisition systems detect airborne objects utilizing different types of detection systems.

15. The acquisition system for detecting an airborne object of claim 14 wherein a first acquisition system is a radar acquisition system and a second acquisition system is an optical acquisition system.

16. A method of detecting an airborne object, the method comprising the steps of:

providing a plurality of acquisition systems for scanning a portion of the sky, each acquisition system capable of detecting an airborne object and providing data on each detected airborne object, wherein one of the plurality of acquisition systems is a reverse logic optical acquisition system;

compiling data by a computing system received from each acquisition system; and determining a target resolution by the computing system from the compiled data;

wherein the target resolution provides information for targeting and destroying the airborne object.

17. The method of detecting an airborne object of claim 16 wherein at least two of the acquisition systems detect airborne objects utilizing different types of detection systems.

18. The method of detecting an airborne object of claim 16 further comprising the step of selecting a weight value for each acquisition system for determining the target resolution from the compiled data.

* * * * *

UNITED STATES PATENT AND TRADEMARK OFFICE
CERTIFICATE OF CORRECTION

| | | |
|---|---|---|
| PATENT NO. | : 7,551,781 B1 | Page 1 of 1 |
| APPLICATION NO. | : 11/471361 | |
| DATED | : June 23, 2009 | |
| INVENTOR(S) | : Dunbar, Jr. | |

It is certified that error appears in the above-identified patent and that said Letters Patent is hereby corrected as shown below:

Title Page

(73) Assignee: Delete "AJTech, Inc.", and replace with --AdTech, Inc.--

Signed and Sealed this
Fifth Day of August, 2014

Michelle K. Lee
*Deputy Director of the United States Patent and Trademark Office*